United States Patent [19]

Becker et al.

[11] 4,347,755

[45] Sep. 7, 1982

[54] WINDOW LIFTER

[75] Inventors: Herbert Becker, Coburg; Josef Tischler, Lichtenfels, both of Fed. Rep. of Germany

[73] Assignee: Metallwerk Max Brose GmbH & Co., Coburg, Fed. Rep. of Germany

[21] Appl. No.: 113,108

[22] Filed: Jan. 17, 1980

[30] Foreign Application Priority Data

Feb. 5, 1979 [DE] Fed. Rep. of Germany ....... 2904292

[51] Int. Cl.[3] .......................... F16H 1/12; F16H 57/04

[52] U.S. Cl. .................................... 74/421 A; 74/439; 74/467; 49/350

[58] Field of Search ................. 74/421 R, 421 A, 439, 74/445, 446, 467; 49/342, 349, 350

[56] References Cited

U.S. PATENT DOCUMENTS 1,064,736 6/1913 James ................................ 74/421 A
2,211,755 8/1940 McGay ............................ 74/421 A
2,467,849 4/1949 O'Brien et al. ................... 74/421 A
2,759,368 8/1956 Kitto ..................................... 74/467
2,771,786 11/1956 Gilbert et al. .................... 74/421 A
2,848,218 8/1958 Leslie et al. ........................... 49/349
2,905,003 9/1959 Meyer et al. ..................... 74/421 R
2,908,180 10/1959 Swenson .......................... 74/421 A
3,508,630 4/1970 Keller et al. .......................... 74/467
3,626,779 12/1971 Howard ............................... 74/439
3,783,702 1/1974 Dehler ................................. 49/349

FOREIGN PATENT DOCUMENTS 806681 12/1958 United Kingdom .................. 49/349

*Primary Examiner*—Lawrence J. Staab
*Attorney, Agent, or Firm*—Toren, McGeady & Stanger

[57] ABSTRACT

In a window lifter, an electric motor drives a window lifting arm via a gear arrangement. The gear arrangement includes a pinion interconnected with a larger diameter gear with both rotatably mounted on a pin. The pin is secured at one end to a base plate and at its other end to a stirrup. The pinion bears against the base plate, the stirrup extends outwardly from diametrically opposite sides of the gear and is connected at its ends outwardly from the gear to the base plate.

6 Claims, 3 Drawing Figures

WINDOW LIFTER

The invention relates to a window lifter, particularly a window lifter for motor vehicles, with an electrically driven lifter arm and a stepdown gear unit which is mounted on a base plate and in which a gear is fixedly connected with respect to rotation in a coaxial position to a second gear (pinion) which has a smaller diameter.

In a known window lifter of this type, the force of the electrical drive is transmitted to the lifter arm as follows: A motor output pinion engages a gear which is fastened on another pinion. This pinion, in turn, is in engagement with a toothed sector which is rigidly connected to the lifter arm. Lifter arm and sector are fastened on the base plate.

In the described embodiment, the gear is mounted on the end of a pin extending from the pinion and is securely fixed with respect to rotation at this location by rivets and a suitable design of engaging surfaces. The pinion pin is mounted concentrically in a base plate bushing.

Experience has shown that the above-mentioned pinion bearing is unsatisfactory in many respects: When a load is applied on the pinion from the gear or the motor drive, the bearing can occasionally wear relatively quickly. Substantial losses due to friction occur; it must be expected that the connection of gear and pinion will loosen over time.

To eliminate the above-mentioned disadvantages, in a window lifter of the above-mentioned type, it is provided in accordance with the invention that the pinion is rotatably mounted on a pin, that the pin, with its one end, is directly supported in the base plate and, with its other end, in a stirrup which is fixed on the base plate, and that the pinion is through its teeth connected to the gear.

The proposal for a solution starts from the observation that the pinion bearing of the lifter design which is part of the prior art wears particularly because of the fact that it is subjected to a unilateral load application during operation. This cause of wear is eliminated if, as provided in accordance with the invention, the pinion rotates about a pin which is supported on both sides. In addition, such a bearing does not require the expensive bushing which had always been required in the past and makes it possible, with the same load application on the bearing from the drive, to reduce the diameter of the bearing and, thus, to reduce the losses due to friction. The connection between the pinion and the gear provided in accordance with the invention offers special advantages: a splined connection is created which, with respect to the diameter as well as the positive connections resulting from the shape, facilitates a significant increase of the forces and torques which can be transmitted. Accordingly, when the forces remain the same, the gear could be produced of a material with lower strength, for example, sintered metal. This may have an advantageous effect on the weight as well as the quality and the cost of the material used. As a result, a window lifter is obtained which operates especially reliably and with a high efficiency and can be produced relatively inexpensively.

Advantageous embodiments and further developments of the invention are the subject matter of additional claims.

The invention shall now be explained in more detail with the aid of a preferred embodiment in connection with the attached drawing. In the figures, corresponding parts are provided with the same reference numerals. In the drawing.

Figure 1:
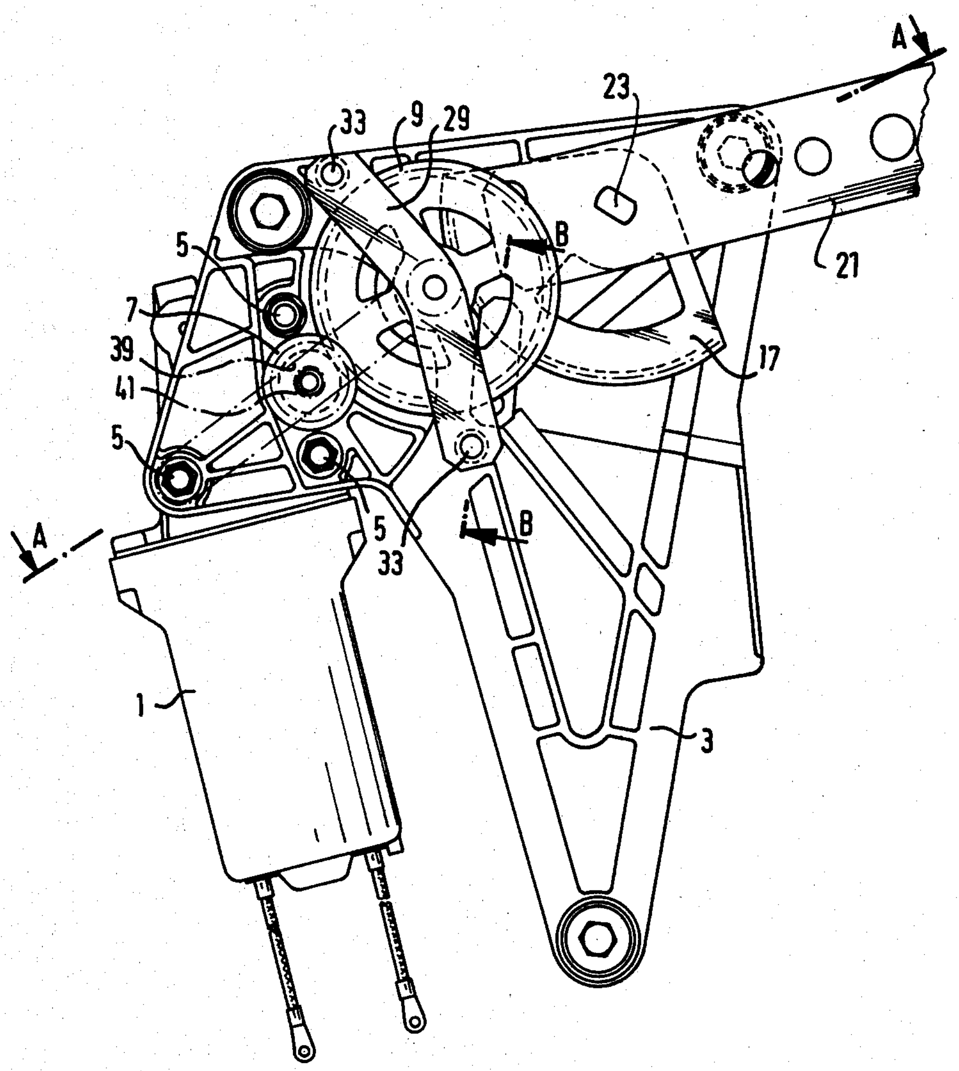
FIG. 1 shows the embodiment in a top view, partially broken away.

The figures show an electrically driven window lifter for a motor vehicle. In the illustrated embodiment, an electric motor 1 is flanged to a base plate 3 by means of three fastening screws 5. A motor output pinion 7 engages a gear 9 which is fixed on a pinion 11. The pinion 11 engages a toothed sector 17 which is rigidly connected to a lifter arm 21 by means of rivets 19. The toothed sector 17 and the lifter arm 21 are supported on a spring bolt 23 in the base plate 3.

Figure 2:
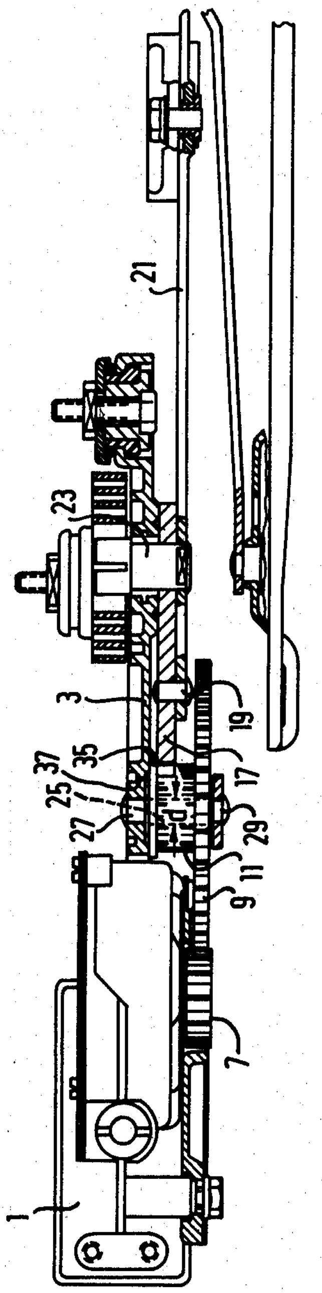
FIG. 2 shows the window lifter of FIG. 1 in the section A—A.

As can be seen from FIG. 2, the pinion 11 is mounted on a pin 25 which, with its one end (end 27), is supported in the base plate 3, and with its other end, by a stirrup 29. The pinion 11 runs on a diameter d. The ratio between the transverse dimension d and the outer diameter of the pinion 11 should have a value of between 0.1 and 0.5, preferably between 0.25 and 0.4. The pinion rests on the base plate through a flange 35. The flange 35 is made in one piece with the pinion 11 and, thus, increases the strength of the teeth of the pinion 11 and, together with the base plate 3, forms pockets 37 for lubricant.

The connection which is rigid with respect to rotation between the gear 9 and the pinion 11 is effected by the pinion teeth which are stripped by approximately one-half. Since this is a connection of the splined type, very high torques can be transmitted. On the other hand, when the torques remain the same, it is possible to make the gear 9 of a material of lower strength and which, therefore, is less expensive and of lighter weight.

Figure 3:
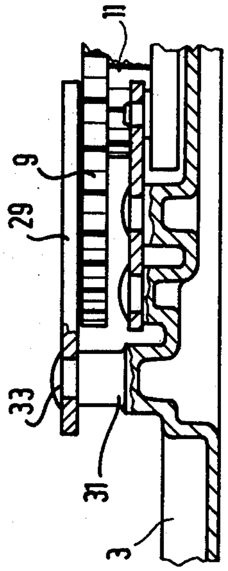
FIG. 3 shows the window lifter of FIG. 1 in the section B—B.

FIG. 3 shows that, in the present embodiment, the stirrup 29 is riveted to the base plate 3 at two points (rivet points 33) by means of rivet bolts 31. These bolts are molded from the base plate which consists of cast metal, particularly cast aluminum, or also of steel or even plastics material.

As a result of the force distribution existing in the described embodiment, the base plate 3 is subjected to relatively low loads and, therefore, allows the use of light and inexpensive materials.

An especially stable support of the stirrup 29 and the motor output pinion 7 is obtained when the stirrup has a T-shaped longitudinal web 39 whose end is fastened on the base plate 3 and in which a bearing bore 41 for the motor output pinion 7 is provided.

We claim:

1. Window lifter particularly for use in motor vehicles, comprising a base plate, an electric motor, a window lifting arm supported on said base plate, means in operative engagement with said electric motor and said window lifting arm for transmitting the driving power from said motor to said lifting arm, said means including an axially extending pin having a first end and a second end, a pinion rotatably mounted on said pin intermediate the first and second ends thereof, said pinion having a first end face and a second end face each extending transversely of the axial direction of said pin and facing in opposite directions, a gear having a larger diameter than said pinion and concentrically rotatably mounted on said pin with said pinion, said pinion and gear rigidly interconnected at the second end face of said pinion for rotation together on said pin, the first end of said pin is fixed to said base plate, wherein the improvement comprises that the first end face of said pinion contacts said base plate, a stirrup secured to the second end of said pin and said stirrup extending transversely of the axial direction of said pin laterally outwardly from the diametrically opposite sides of said gear and said stirrup is attached to said base plate laterally outwardly from both of the opposite sides of said gear, said pinion includes a flange formed as a unit with said pinion and forming the first end face of said pinion and said first end face formed by said flange in combination with said base plate forms a lubricant pocket.

2. Window lifter particularly for use in motor vehicles, comprising a base plate, an electric motor, a window lifting arm supported on said base plate, means in operative engagement with said electric motor and said window lifting arm for transmitting the driving power from said motor to said lifting arm, said means including an axially extending pin having a first end and a second end, a pinion rotatably mounted on said pin intermediate the first and second ends thereof, said pinion having a first end face and a second end face each extending transversely of the axial direction of said pin and facing in opposite directions, a gear having a larger diameter than said pinion and concentrically rotatably mounted on said pin with said pinion, said pinion and gear rigidly interconnected at the second end face of said pinion for rotation together on said pin, the first end of said pin is fixed to said base plate, wherein the improvement comprises that the first end face of said pinion contacts said base plate, a stirrup secured to the second end of said pin and said stirrup extending transversely of the axial direction of said pin laterally outwardly from the diametrically opposite sides of said gear and said stirrup is attached to said base laterally outwardly from both of the opposite sides of said gear, said stirrup includes a T-shaped longitudinal web extending transversely outwardly from the portion of said stirrup extending outwardly from the opposte sides of said gear, said T-shaped web is attached to said base plate and said web having a bearing bore therein, said electric motor including a motor output pinion held in said bearing bore.

3. Window lifter, as set forth in claim 1 or 2, wherein said pinion is interconnected with said gear having a spline-like connection therebetween.

4. Window lifter, as set forth in claims 1 or 2, wherein the ratio between the diameter of said pin and the outside diameter of said pinion is in the range of 0.1 to 0.5.

5. Window lifter, as set forth in claim 4, wherein the ratio between the diameter of said pin and the outside diameter of said pinion is in the range of 0.25 to 0.4.

6. Window lifter, as set forth in claim 1 or 2, wherein at least one of said pinion and said gear is formed of a sintered metal.

* * * * *